(12) United States Patent
Lieven et al.

(10) Patent No.: US 11,407,487 B2
(45) Date of Patent: Aug. 9, 2022

(54) UNITARY AIRCRAFT WINDSHIELD WITH CONICAL SINGLE CURVATURE

(71) Applicant: Airbus Operations SAS, Toulouse (FR)

(72) Inventors: Patrick Lieven, Toulouse (FR); Christophe Mialhe, Toulouse (FR); Jérôme Phalippou, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 16/953,832

(22) Filed: Nov. 20, 2020

(65) Prior Publication Data
US 2021/0163116 A1 Jun. 3, 2021

(30) Foreign Application Priority Data
Nov. 29, 2019 (FR) ...................................... 1913475

(51) Int. Cl.
*B64C 1/14* (2006.01)
*B64C 1/00* (2006.01)
(52) U.S. Cl.
CPC .......... *B64C 1/1492* (2013.01); *B64C 1/0009* (2013.01)
(58) Field of Classification Search
CPC ... B64C 1/1476; B64C 1/1484; B64C 1/1492; B64C 1/14
See application file for complete search history.

(56) References Cited

U.S. PATENT DOCUMENTS 2,367,035 A * 1/1945 McConnell ........... B64C 1/1492
244/121
5,114,097 A * 5/1992 Williams ............... B64D 33/02
244/119
2004/0069903 A1* 4/2004 Retz ...................... B64C 1/0683
244/119

(Continued)

FOREIGN PATENT DOCUMENTS

CN   109533379 A  *  3/2019  ........... B64C 1/1492
CN   109533379 A     3/2019

(Continued)

OTHER PUBLICATIONS

French Search Report; priority document.

*Primary Examiner* — Richard R. Green
*Assistant Examiner* — Ryan Andrew Yankey
(74) *Attorney, Agent, or Firm* — Greer, Burns & Crain, Ltd.

(57) ABSTRACT

A windshield for an aircraft cockpit is provided which includes a glazed windshield part which has a single curvature corresponding to a portion of the envelope of a cone extending between a lower plane and an upper plane which intersect an axis of the cone. The single curvature of the glazed part of the windshield enables the glazed part to be produced more easily, for example by rolling or by hydroforming. It also makes it possible to create configurations for a cockpit for two pilots, a single pilot or even no pilot, on the basis of a single aerodynamic shape of the fuselage of the aircraft by only adapting the structure of the windshield.

(Continued)

Also provided are a windshield frame for such a windshield, a windshield assembly including such a windshield frame and such a windshield, and an aircraft equipped with such a windshield.

4 Claims, 6 Drawing Sheets

(56) References Cited

U.S. PATENT DOCUMENTS

2016/0052616 A1\* 2/2016 Nakashima ........... B64C 1/1492
244/121

FOREIGN PATENT DOCUMENTS

| EP | 1481892 A2 \* | 12/2004 | ........... B64C 1/1492 |
| EP | 2740662 B1 \* | 4/2018 | ........... B64C 1/1492 |
| FR | 2905669 A1 \* | 3/2008 | ........... B64C 1/1476 |
| GB | 406138 A | 2/1934 | |

\* cited by examiner

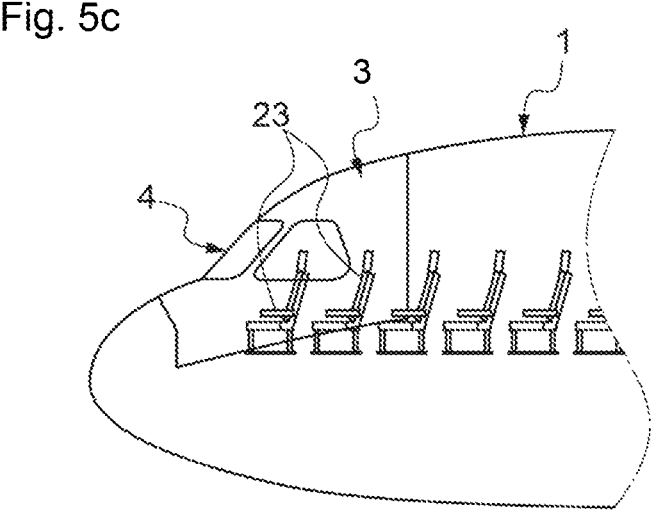
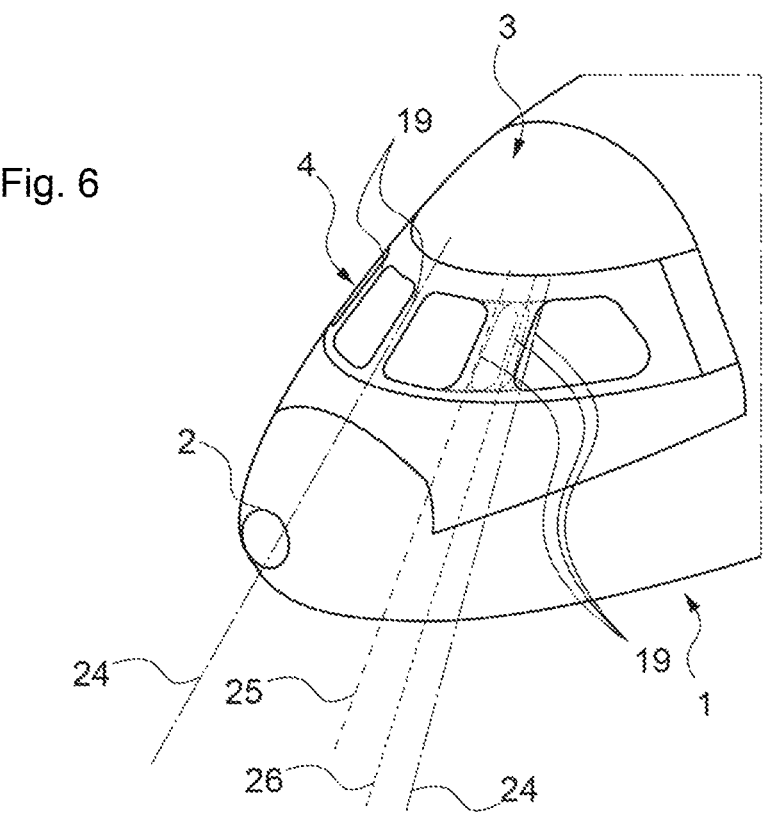

UNITARY AIRCRAFT WINDSHIELD WITH CONICAL SINGLE CURVATURE

CROSS-REFERENCES TO RELATED APPLICATIONS

This application claims the benefit of the French patent application No. 1913475 filed on Nov. 29, 2019, the entire disclosures of which are incorporated herein by way of reference.

FIELD OF THE INVENTION

The present invention relates to a windshield structure for an aircraft cockpit.

It relates in particular to a windshield for an aircraft cockpit, to a windshield frame for an aircraft cockpit, to a windshield assembly for an aircraft cockpit, and to an aircraft.

The invention relates in particular, but not solely, to aircraft whose cockpit can be configured to be operated by two pilots, by a single pilot seated on one side or the other of a median line of the windshield, by a single pilot seated in the middle of the cockpit, or without a pilot.

BACKGROUND OF THE INVENTION

Aircraft cockpit windshield structures wherein the glazed parts are either planar or have single or double curvature are known.

Double-curvature windshields are more difficult to produce and their curvature generates optical distortions.

A windshield having planar glazed surfaces gives rise to aerodynamic disturbances on the frontal and lateral parts of the cockpits equipped therewith, which impairs the aerodynamic performance of these aircraft.

SUMMARY OF THE INVENTION

The present invention aims to propose an aircraft cockpit windshield structure that is easy to produce and that permits aerodynamic optimization of the nose of an aircraft without optical distortion.

A first aspect of the invention proposes a windshield for an aircraft cockpit, which comprises at least one glazed part of a windshield which has a single curvature corresponding to a portion of the envelope of a cone comprised between a lower plane and an upper plane which intersect the axis of the cone, the glazed part comprising two unitary lateral glazed parts and at least one unitary frontal glazed part; the curvature of the two lateral glazed parts and of the at least one frontal glazed part corresponding to the single curvature of the portion of the envelope of the cone, and a lower edge and an upper edge of the windshield being positioned horizontally.

The single curvature of the glazed part of the windshield makes it easier to produce the metal plate from which the structure receiving the glazed part is created. This can be obtained, for example, by rolling or by hydroforming.

The windshield formed of multiple glazed parts has a continuous curved surface, which reduces aerodynamic disturbances and optical distortions.

Preferably, a lower edge and an upper edge of the windshield embody the intersection between the intersecting lower and upper planes and the envelope of the cone.

The lower and upper edges form the upper and lower transitions between the windshield and the surrounding fuselage part. These transitions are smoother with this form of windshield, which improves aerodynamic performance.

Advantageously, the lower edge is in the shape of a continuous elliptical curve representing the intersection between the lower intersecting plane and the envelope of the cone.

This arrangement of the lower edge makes it possible to easily modify the angular position of the windshield with respect to the horizontal in order to optimize the shape of the nose of the fuselage of the aircraft in order to improve its aerodynamic performance or to optimize the internal volume of the cockpit.

A second aspect of the invention proposes a windshield frame for mounting, on an aircraft, a windshield for an aircraft cockpit as defined above, wherein outer surfaces of the windshield are inscribed in the envelope of the cone defining the curvature of the glazed surfaces, the windshield frame comprising a lateral windshield pillar along each outer side of the windshield, and at least two intermediate windshield pillars, each separating two adjacent glazed windshield parts, the intermediate windshield pillars being essentially identical, straight and aligned with a respective generatrix of the cone forming the curvature of the at least one glazed part of a windshield.

Thus, the elements making up the windshield frame are easy to produce and create, with the glazed surfaces, a continuous surface that reduces both aerodynamic disturbances and optical distortions.

This straight configuration of the pillars increases their ability to withstand the compressive and tensile loads to which they are subjected.

In addition, the intermediate windshield pillars are aligned with generatrices of the envelope of the cone whose position is dependent on the configuration of the cockpit for two pilots, for a single pilot seated on one side or the other of a median line of the windshield, for a single pilot seated in the middle of the cockpit, or for no pilot.

Thus, the intermediate windshield pillars are positioned on the envelope of the cone depending on the desired configuration for the cockpit and the desired number of frontal glazed parts, and permit great versatility and adaptability, at low cost, of the proposed configurations for the cockpit.

A third aspect of the invention proposes a windshield assembly for an aircraft cockpit comprising a windshield as described above and a windshield frame as described above in which the at least one glazed windshield part is fitted.

Advantageously, the windshield assembly for an aircraft cockpit further comprises lateral plates forming the transition between the lateral sides of the windshield assembly and the facing fuselage parts of the cockpit and ensuring the aerodynamic continuity of a fuselage nose.

These lateral plates permit a smooth transition between the surface of the windshield assembly and the adjoining surfaces of the fuselage nose, which reduces aerodynamic disturbances.

A fourth aspect of the invention proposes an aircraft comprising a cockpit located in a front fuselage portion, whose cockpit is provided with a windshield assembly as defined above.

Further particular features and advantages of the invention will become more apparent from the following description of the invention. This description of the invention is provided solely by way of non-limiting example.

BRIEF DESCRIPTION OF THE DRAWINGS

In the appended drawings, which are also given by way of non-limiting examples:

FIG. 5c represents a side view of an aircraft cockpit provided with a third configuration of the windshield according to the invention, FIG. 6 represents a perspective view of an aircraft cockpit with a superposition of the three windshield configurations illustrated in FIGS. 3a to 5c.

DETAILED DESCRIPTION OF THE PREFERRED EMBODIMENTS

Figure 1:
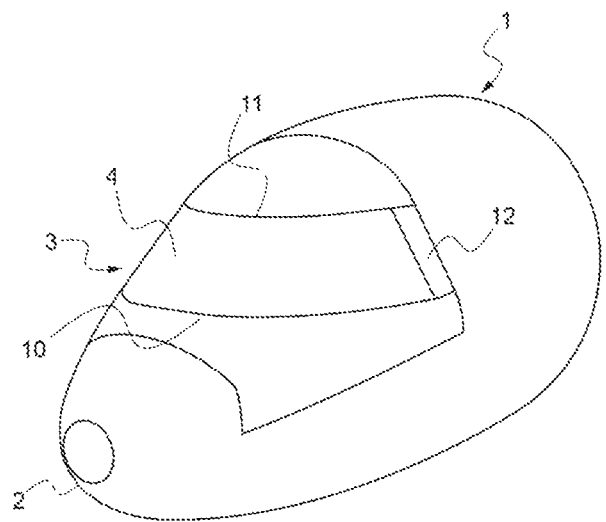
FIG. 1 represents a perspective view of an aircraft cockpit with a schematic representation of the windshield according to the invention.

FIG. 1 shows a front part of an aircraft fuselage 1 having a fuselage nose 2 above which is a cockpit 3. The cockpit 3 generally accommodates the piloting station for one or two pilots, depending on the certification of the aircraft. The cockpit is equipped with a windshield 4 that extends over the entire frontal part and partially over the lateral parts of the cockpit in order to provide the pilots with the best possible visibility. The outer surface of the windshield, owing to its position at the front of the aircraft, has a substantial influence on the aerodynamics of the fuselage. It must therefore provide aerodynamic continuity of the outer surface of the cockpit in a region of the fuselage having relatively complex geometry.

Figure 2:
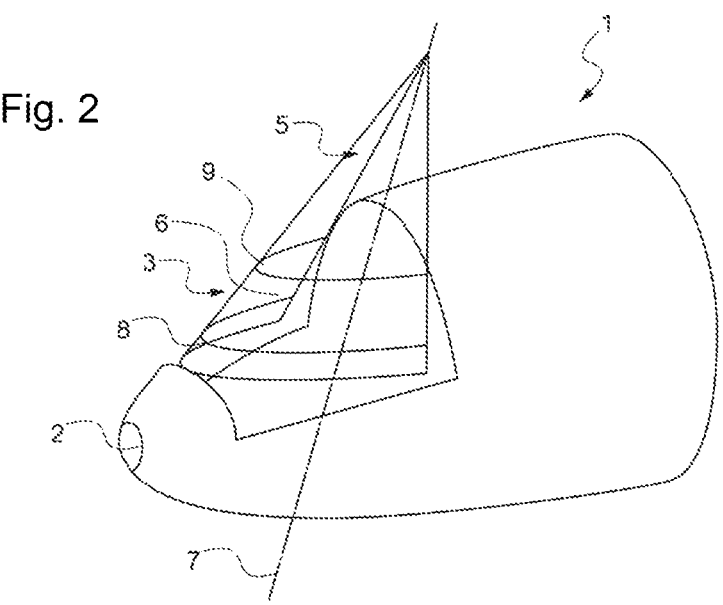
FIG. 2 represents a perspective view of the front part of the fuselage of an aircraft.

As shown in FIG. 2, the windshield 4 has a single curvature inscribed on the envelope of a cone 5. The portion 6 of the envelope of the cone 5 representing the windshield 4 is comprised vertically between a lower plane and an upper plane that intersect the axis of the cone 5. These lower and upper intersecting planes respectively form a lower curved line 8 and an upper curved line 9 of intersection with the envelope of the cone 5. These lower 8 and upper 9 curved lines embody the lower edge 10 and the upper edge 11 of the windshield 4. In the exemplary implementation of the invention, these lower 10 and upper 11 windshield edges are horizontal and have a generally elliptical continuous curved shape. Nonetheless, depending on the configuration of the cockpit, the lower edge and upper edge of the windshield may be inclined relative to the horizontal. When they are horizontal, the lower and upper intersecting planes may be orthogonal to the axis of the cone, depending on the desired features of the cockpit. The position of the axis 7 of the cone 5 relative to the vertical and the position of the lower 10 and upper 11 edges of the windshield make it possible to optimize the aerodynamic behavior of the cockpit 3 and of the nose 2 of the fuselage 1, and the volume created inside the cockpit 3.

The particular shape of the windshield as described above means that all the glazed parts forming the windshield have a single conical curvature. Thus, the glazed part of the windshield 4 is formed of one or more unitary sections having identical single curvature, which are easier to manufacture. Indeed, in addition to the hydroforming manufacturing technique, it is possible, as the case may be, to use rolling. Thus, one of the advantages of the single curvature is to provide simple ways of assembling parts, and simplified subassemblies. This single curvature also makes it possible to provide flexibility for the choice of technologies for creating parts and assemblies. This flexibility is limited by the shapes of fuselage noses having windshields with double curvature or planar surfaces.

Each lateral end of the windshield 4 is extended by a lateral plate 12. These lateral plates 12 form the transition between the sides of the windshield and the facing parts of the cockpit fuselage. Thus, they ensure the aerodynamic continuity of the outer surfaces at the cockpit, between the single conical curvature of the windshield and the outer wall of the front part of the fuselage 1.

As shown in FIGS. 3a to 5b, the glazed part of the windshield 4 comprises two unitary lateral glazed parts 13 and one or two unitary frontal glazed parts 14. As indicated above, the curvature of the two lateral glazed parts 13 and of the frontal glazed part(s) 14 correspond to the single curvature of the portion 6 of the envelope of the cone 5 forming the windshield 4. The single-curvature topology of the glazed surfaces makes it possible to avoid the optical distortions that are inherent to double-curvature glazed surfaces. It also has better aerodynamic properties than planar glazed surfaces, in which the transitions to and from the curves of the outer surfaces of the cockpit 3 give rise to aerodynamic turbulence.

The lateral 13 and frontal 14 glazed parts are built into a windshield frame 15. The windshield frame 15 is installed in the fuselage of the aircraft at the cockpit in order to mechanically hold the windshield 4 on the cockpit 3. The outer surfaces of the windshield frame are inscribed in line with the outer surfaces of the glazed parts on the envelope of the cone 5 defining the single curvature of the glazed surfaces. Thus, the assembly formed by the windshield frame 15 and the glazed parts has a single conical curvature providing aerodynamic continuity of the frontal part of the front part of the fuselage 1.

The windshield frame 15 is formed by a lower windshield frame section 16 and by an upper windshield frame section 17. The lower 10 and upper 11 edges of the glazed parts of the windshield are mounted respectively in the lower windshield frame section 16 and in the upper windshield frame section 17.

The windshield frame 15 also comprises a lateral windshield pillar 18 on either side of the windshield 4 between the lateral plate 12 and the corresponding lateral end of the windshield 4. The outer edges of the lateral glazed parts 13 are built into the lateral windshield pillars 18.

Figure 3A:
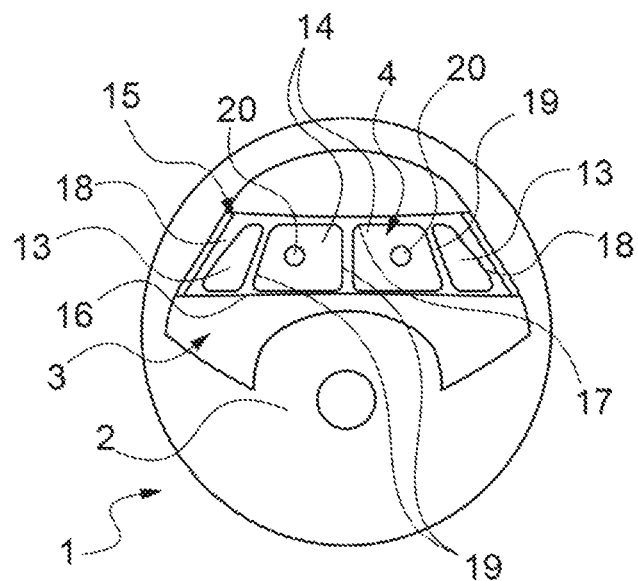
FIG. 3a represents a front view of an aircraft cockpit provided with a first configuration of the windshield according to the invention.
Figure 3B:
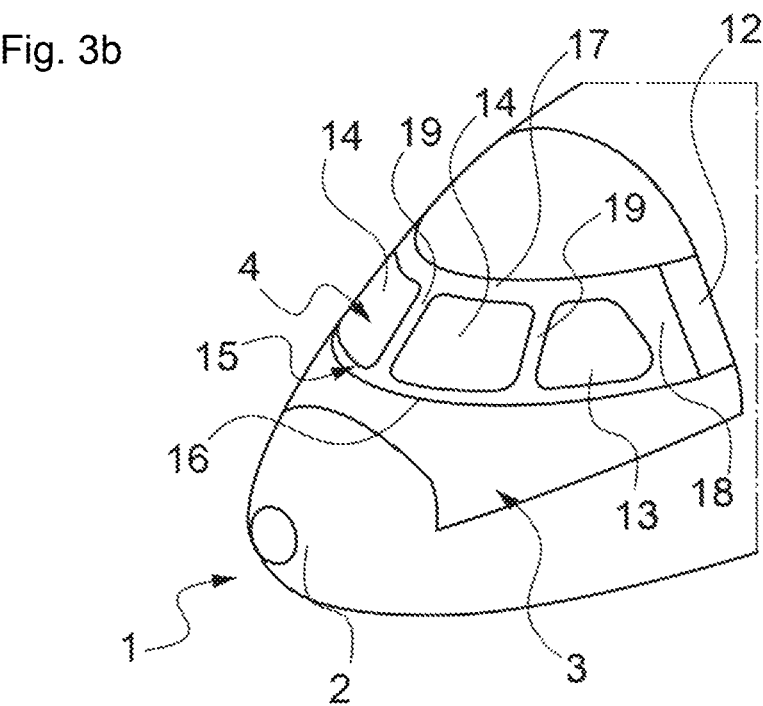
FIG. 3b represents a perspective view of an aircraft cockpit provided with a first configuration of the windshield according to the invention.

The windshield frame 15 also comprises intermediate windshield pillars 19. The intermediate windshield pillars 19 separate the lateral edges of two adjacent glazed parts of the windshield. Depending on the configuration of the windshield, the intermediate windshield pillars 19 may separate the edges of a lateral glazed part 13 and a frontal glazed part 14 that are adjacent, or also, as shown in FIGS. 3a and 3b, the edges of two adjacent frontal glazed parts 14. The intermediate windshield pillars 19 are each aligned with a generatrix of the cone 5. They extend between the lower windshield frame section 16 and the upper windshield frame section 17. Thus, the intermediate windshield pillars 19 are essentially identical (within manufacturing tolerances). Moreover, they mechanically connect the lower windshield frame section 16 and the upper windshield frame section 17. Their straight shape increases their ability to withstand the compressive and tensile loads to which they are subjected. This would not have been the case with a double-curvature windshield, which requires curved pillars that are necessarily weaker both in tension and in compression.

The identical shape of the intermediate pillars 19 means that they can be positioned at any point along the windshield frame sections 16 and 17, and consequently the windshield 4 has high versatility of configuration at low cost, as explained below.

FIGS. 3a and 3b show a first windshield configuration designed for two-pilot piloting of the aircraft. This cockpit configuration is referred to as Dual Pilot Operations (or DPO). In this first configuration, the glazed surface of the windshield 4 comprises two lateral glazed parts 13 and two frontal glazed parts 14. The windshield frame 15 comprises, in addition to the two lateral windshield pillars 18, a central intermediate windshield pillar 19 installed in a median position and separating the two frontal glazed parts 14. In addition, two other intermediate windshield pillars 19 located on either side of the cockpit separate each frontal glazed part 14 from the adjacent lateral glazed part 13. Thus, the head of each pilot 20 is positioned facing a frontal glazed part in order that the pilot has an optimal, distortion-free field of view toward the front and on their side of the aircraft.

The first windshield configuration is also designed in such a way as to permit piloting by a single pilot seated on one of the sides of the aircraft, referred to as "SPO side/side". This cockpit configuration is termed "DPO & SPO side/side". SPO stands for "Single-Pilot Operations" and "side/side" means on either side of the aircraft. Thus, the pilot of the aircraft can pilot while seated either in the right-side pilot seat or in the left-side pilot seat, as indicated by the two possible positions of the pilot's head 20. As previously stated, this configuration provides optimal visibility for the pilot, whether seated on the left or on the right of the cockpit. Thus, the windshield according to the invention may be used in this first configuration equally for DPO or SPO side/side piloting.

Figure 4A:
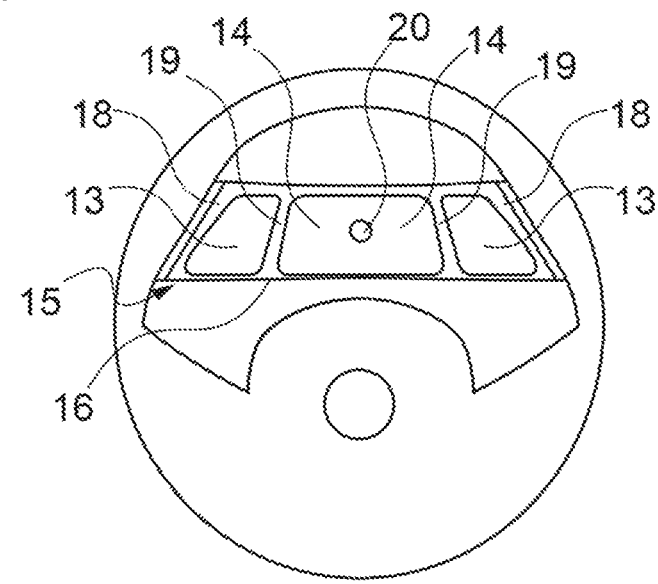
FIG. 4a represents a front view of an aircraft cockpit provided with a second configuration of the windshield according to the invention.
Figure 4B:
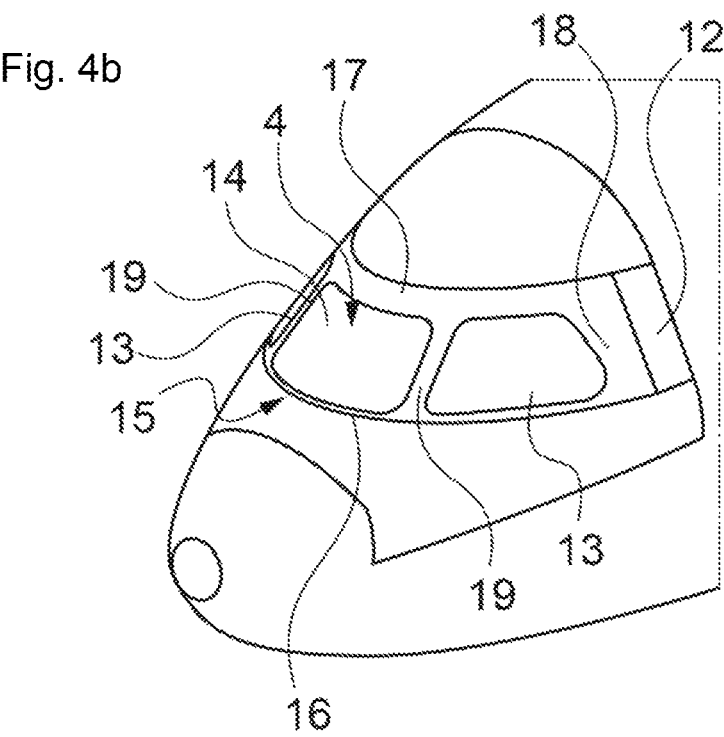
FIG. 4b represents a perspective view of an aircraft cockpit provided with a second configuration of the windshield according to the invention.

FIGS. 4a and 4b show a second windshield configuration designed for the aircraft to be piloted by a single pilot seated in a central position in the cockpit. This cockpit configuration is referred to as "SPO centered", meaning piloting by a single pilot in a centered position. In this "SPO centered" configuration, the glazed surface of the windshield 4 comprises two lateral glazed parts 13 and a single frontal glazed part 14. The windshield frame 15 comprises, in addition to the two lateral windshield pillars 18, two intermediate windshield pillars 19 which are located on either side of the median line of the cockpit and which separate each side of the frontal glazed part 14 from the adjacent lateral glazed part 13. Thus, the head of the pilot 20 is positioned facing the median line of the frontal glazed part 14 in order that the pilot has an optimal, distortion-free field of view toward the front and of either side of the aircraft. In this configuration, the central intermediate windshield pillar is eliminated and the two remaining intermediate windshield pillars are moved along the envelope of the cone 5 toward the median part of the windshield 4. In this configuration, the frontal glazed part 14 is suitable for the sight diagram of a pilot in the central position. This means that the lateral glazed parts 13 are wider than in the DPO & SPO side/side configuration.

Figure 5A:
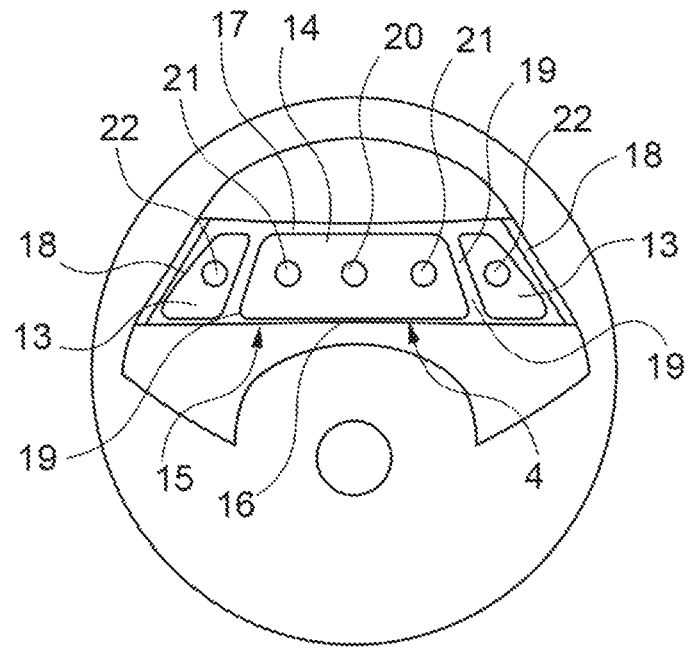
FIG. 5a represents a front view of an aircraft cockpit provided with a third configuration of the windshield according to the invention.
Figure 5B:
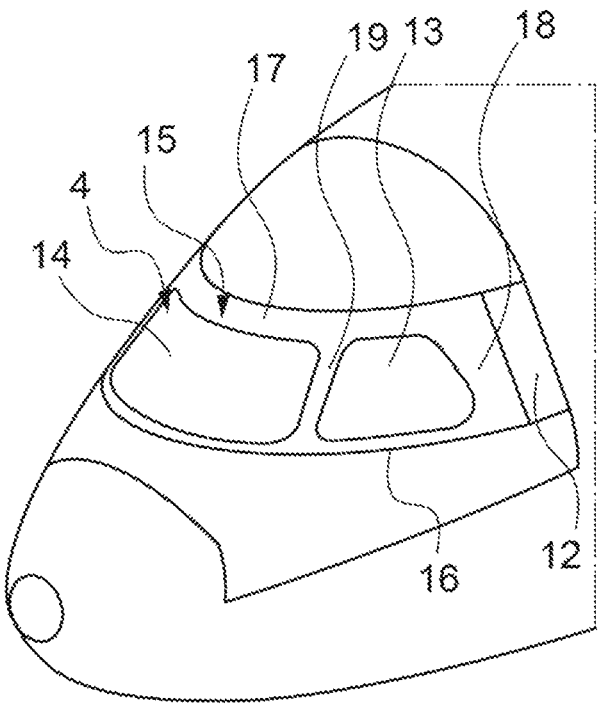
FIG. 5b represents a perspective view of an aircraft cockpit provided with a third configuration of the windshield according to the invention.

FIGS. 5a and 5b show a third windshield configuration designed for the aircraft to be piloted by a single pilot seated in a central position in the cockpit, SPO centered. This third configuration is also compatible for DPO. This cockpit configuration is termed "DPO & SPO full compatible", meaning that single-pilot and dual-pilot piloting are entirely compatible. In this "DPO & SPO full compatible" configuration, the glazed surface of the windshield 4 comprises two lateral glazed parts 13 and a single frontal glazed part 14. In this configuration, the frontal glazed part 14 is dimensioned so as to be compatible with the SPO and DPO sight diagrams, that is to say, it is wider than in the preceding configuration. The windshield frame 15 comprises, in addition to the two lateral windshield pillars 18, two intermediate windshield pillars 19 which are located on either side of the median line of the cockpit and which separate each side of the frontal glazed part 14 from the adjacent lateral glazed part 13. Thus, in SPO mode, the head of the pilot 20 is positioned facing the median line of the frontal glazed part 14 in order that the pilot has an optimal, distortion-free field of view toward the front and of either side of the aircraft. As in this DPO & SPO full compatible configuration, in SPO mode the pilot is seated at the center of the cockpit, the central intermediate windshield pillar 19 is eliminated and the two remaining intermediate windshield pillars are moved along the envelope of the cone 5 toward the median part of the windshield 4. In DPO mode, the pilots' heads 21 are positioned facing the frontal glazed part 14, on either side of the median line of the frontal glazed part 14.

The position of the intermediate windshield pillars 19 makes it possible to define the dimension of the frontal glazed part(s) 14.

The third configuration of the windshield, described above in the context of a "DPO & SPO full compatible" cockpit configuration, may also be implemented for a no-pilot configuration, also termed a ZPO (Zero-Pilot Operations) configuration. As shown in FIG. 5c, when the cockpit 3 is in a ZPO configuration, rows of passenger seats 23 are installed up to the reserved space normally taken up by the pilot seats in the DPO or SPO configurations. Thus, the circles 21 represent the heads of the passengers sitting in the first row, which has just one passenger on either side of the aisle. The circles 22 represent the heads of the passengers sitting in the second row, close to the fuselage. The second row has, on either side of the aisle, two passengers sitting side-by-side. This third aircraft windshield configuration is therefore not only compatible for aircraft certified for two pilots or just one pilot, but is also compatible for a future no-pilot certification with passengers accommodated in the cockpit.

Thus, by changing the position of the intermediate windshield pillars 19 along the envelope of the cone 5 defining the single curvature of the windshield 4, all of the above-described cockpit configurations are possible with a single primary structure and a single aerodynamic shape of the front part of the fuselage 1 and of the cockpit 3. At the structural level, only the structure of the windshield 4 changes on the basis of a windshield frame composed in part of elements that have standard characteristics and that can therefore be easily reproduced. FIG. 6 shows by superposition the positions of the intermediate windshield pillars 19 which define the various above-described configurations of the windshield. The positions of the intermediate windshield pillars 19 are represented in FIG. 6 by different broken lines. The positions of the intermediate windshield pillars 19 according to the first configuration, termed DPO & SPO side/side, are shown by two dash-dotted lines 24. The position of one of the intermediate windshield pillars 19 according to the DPO & SPO centered configuration is shown by a dashed line 25. Thus, FIG. 6 shows that the intermediate windshield pillars 19 in the DPO & SPO centered configuration are closer to the center of the windshield 4 than in the DPO & SPO side/side position, while the central intermediate windshield pillar 19 has been eliminated. Thus, the glazed surfaces are optimized to improve the pilot's obstruction-free field of view in the DPO or SPO centered cockpit configuration, compared to an SPO side/side configuration that is also compatible for a DPO configuration. In the last configuration, termed DPO & SPO centered & ZPO, the central intermediate windshield pillar 19 has also been eliminated since there is only a single frontal glazed part 14. The positions of the two remaining intermediate windshield pillars 19 are shown by the dashed line 26.

Thus, as described above and illustrated in FIG. 6, all the cockpit configurations are possible by changing the position of the intermediate windshield pillars 19 along the envelope of the cone 5 defining the single curvature of the windshield 4. All these cockpit configurations—DPO, SPO or even ZPO—are possible with a single aerodynamic shape for the fuselage of the aircraft. They therefore require just a single primary structure since only the structure of the windshield changes from one cockpit configuration to another. This changeable solution provides great versatility of cockpit configurations with a single structural platform. Thus, the number of structural elements not requiring adaptation according to the wishes of the client is maximized while the number of those requiring adaptation is reduced to only the windshield elements. As a result, the windshield is made modular in order to make the surrounding structure independent of the internal configuration of the cockpit. This solution considerably reduces the cost of producing the aircraft since at least four internal cockpit configurations (DPO, SPO side-side, SPO centered or ZPO) are covered by a single external cockpit configuration and a single cockpit structure that is able to convey the loads coming from the various positions of the intermediate windshield pillars. The present document describes only four internal cockpit configurations, but other possibilities may be obtained by virtue of the invention.

Figure 7:
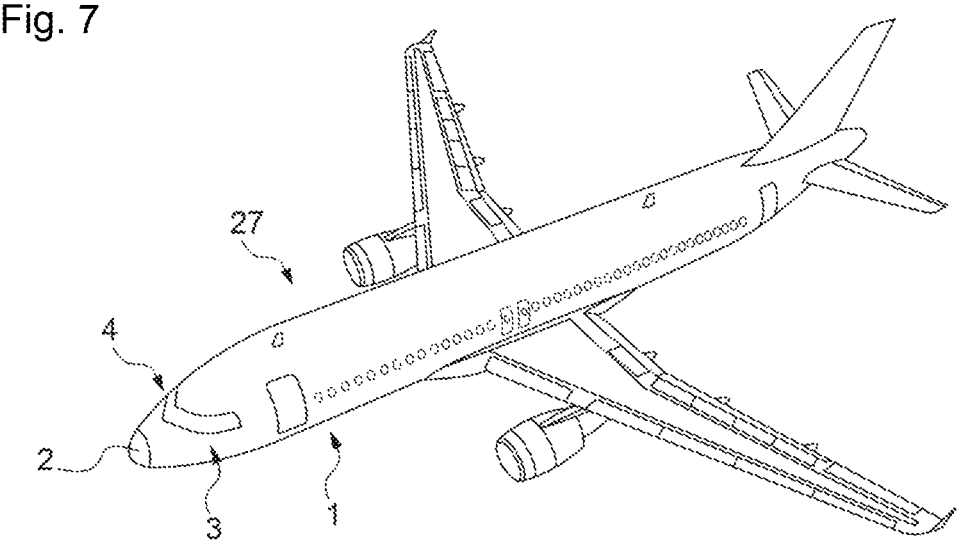
FIG. 7 represents a perspective view of an aircraft.

FIG. 7 illustrates an aircraft 27 equipped with a windshield 4 as described above.

Thus, an airline may decide to choose the configuration that they wish to order, and/or to subsequently refurbish their aircraft when the technologies associated with the SPO or ZPO configurations can be certified.

By virtue of the versatility of configurations made possible by the invention, it is possible to envisage other implementations of a single-curvature windshield that are different from those described above, such as a windshield having just a single glazed part.

Thus, the structure of the windshield can be obtained in one piece or differentially, that is to say from a plurality of assembled parts.

Moreover, the ZPO configuration may also be offered to airlines regardless of the chosen structural configuration (see FIGS. 3a to 5b).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A windshield assembly for an aircraft cockpit comprising:
   a windshield comprising:
      at least one glazed part of the windshield which has a single curvature corresponding to a portion of an envelope of a cone comprised between a lower plane and an upper plane which intersect an axis of the cone,
      said at least one glazed part comprising two unitary lateral glazed parts and at least one unitary frontal glazed part;
      the curvature of the two lateral glazed arts and of said at least one frontal glazed part corresponding to the single curvature of said portion of the envelope of said cone; and
      wherein a lower edge and an upper edge of the windshield are positioned horizontally, and wherein the lower edge of the windshield embodies an intersection between said lower intersecting plane and the envelope of said cone, and wherein the upper edge of the windshield embodies an intersection between said upper intersecting plane and the envelope of said cone, and
   a windshield frame,
      wherein outer surfaces of said windshield frame are inscribed on the portion of the envelope of the cone defining the curvature of the glazed surfaces,
      wherein the windshield frame comprises:
         a lateral windshield pillar along each outer side of said windshield; and
         at least two intermediate windshield pillars configured to each separate two adjacent glazed windshield parts;
            said intermediate windshield pillars being essentially identical, straight and aligned with a respective generatrix of the cone forming the curvature of said at least one glazed part of a windshield,
      wherein said at least one glazed windshield part is fitted,
      wherein the intermediate windshield pillars of the windshield frame are aligned with generatrixes of the envelope of said cone, the position of said intermediate windshield pillars being dependent on a configuration of said cockpit.

2. The windshield assembly for an aircraft cockpit according to claim 1, wherein the windshield assembly further comprises lateral plates forming a transition between sides of the windshield assembly and facing fuselage parts of the cockpit and ensuring an aerodynamic continuity of a fuselage nose.

3. An aircraft comprising a cockpit located in a front fuselage portion, wherein the cockpit is provided with a windshield assembly as defined in claim 1.

4. The windshield assembly for an aircraft cockpit according to claim 1, wherein the lower edge of the windshield has a shape of a continuous elliptical curve representing an intersection between the lower intersecting plane and the envelope of the cone.

\* \* \* \* \*